United States Patent
Jehnert et al.

[11] Patent Number: 5,822,423
[45] Date of Patent: Oct. 13, 1998

[54] APPARATUS AND METHOD FOR SUPERVISING DERIVED CHANNEL COMMUNICATIONS

[75] Inventors: Walt Jehnert, Langhorne, Pa.; Stephen A. Hughey, Sugar Hill, Ga.; James W. Eakes, Suwanee, Ga.; Roger Raymond Darr, Bethlehem, Ga.

[73] Assignee: NumereX Investment Corporation, Wilmington, Del.

[21] Appl. No.: 618,867

[22] Filed: Mar. 20, 1996

[51] Int. Cl.⁶ .................................................. H04M 11/04
[52] U.S. Cl. .............................. 379/352; 379/42; 379/50; 379/92.03; 379/92.04
[58] Field of Search ................................ 379/352, 39, 59, 379/42, 49, 45, 106, 6, 27, 50

[56] References Cited

U.S. PATENT DOCUMENTS

| | | | |
|---|---|---|---|
| 3,868,640 | 2/1975 | Binnie et al. | 379/106.07 |
| 3,899,639 | 8/1975 | Clevely et al. | 379/92.03 |
| 4,162,488 | 7/1979 | Silverman et al. | 379/47 |
| 4,250,353 | 2/1981 | Schreyer et al. | 379/37 |
| 4,332,980 | 6/1982 | Reynolds et al. | 379/49 |
| 4,342,986 | 8/1982 | Buskirk et al. | 379/49 |
| 4,442,320 | 4/1984 | James et al. | 379/42 |
| 4,527,235 | 7/1985 | Chebra | 379/49 |
| 4,528,423 | 7/1985 | James et al. | 379/49 |
| 4,529,971 | 7/1985 | James | 340/508 |
| 4,644,103 | 2/1987 | Rosenfeld | 379/42 |
| 4,741,022 | 4/1988 | Chebra et al. | 379/106 |
| 4,868,859 | 9/1989 | Sheffer | 379/59 |
| 4,903,292 | 2/1990 | Dillon | 379/50 |
| 4,922,515 | 5/1990 | Simpson, Jr. | 379/32 |
| 4,937,851 | 6/1990 | Lynch et al. | 379/32 |
| 5,027,383 | 6/1991 | Sheffer | 379/39 |
| 5,131,019 | 7/1992 | Sheffer et al. | 379/39 |

FOREIGN PATENT DOCUMENTS 2359554  2/1978  France .

*Primary Examiner*—Krista Zele
*Assistant Examiner*—Jacques M. Saint-Surin
*Attorney, Agent, or Firm*—Gary M. Cohen

[57] ABSTRACT

A supervisory signal for a derived channel data reporting system is implemented as a tone having a frequency capable of transmission using a telephone signal communicating network, including networks incorporating digital equipment, at an attenuated level. The tone preferably has a frequency of from 200 Hz to 300 Hz, and is capable of operating in conjunction with biphase modulated (BPSK), frequency shift keyed (FSK) and multi-tone modulated (MLT) polling systems. Such frequencies are effectively communicated by conventional digital loop carrier systems, despite a limited frequency range, and are of a sufficient magnitude to be detected by the derived channel data reporting system.

64 Claims, 5 Drawing Sheets

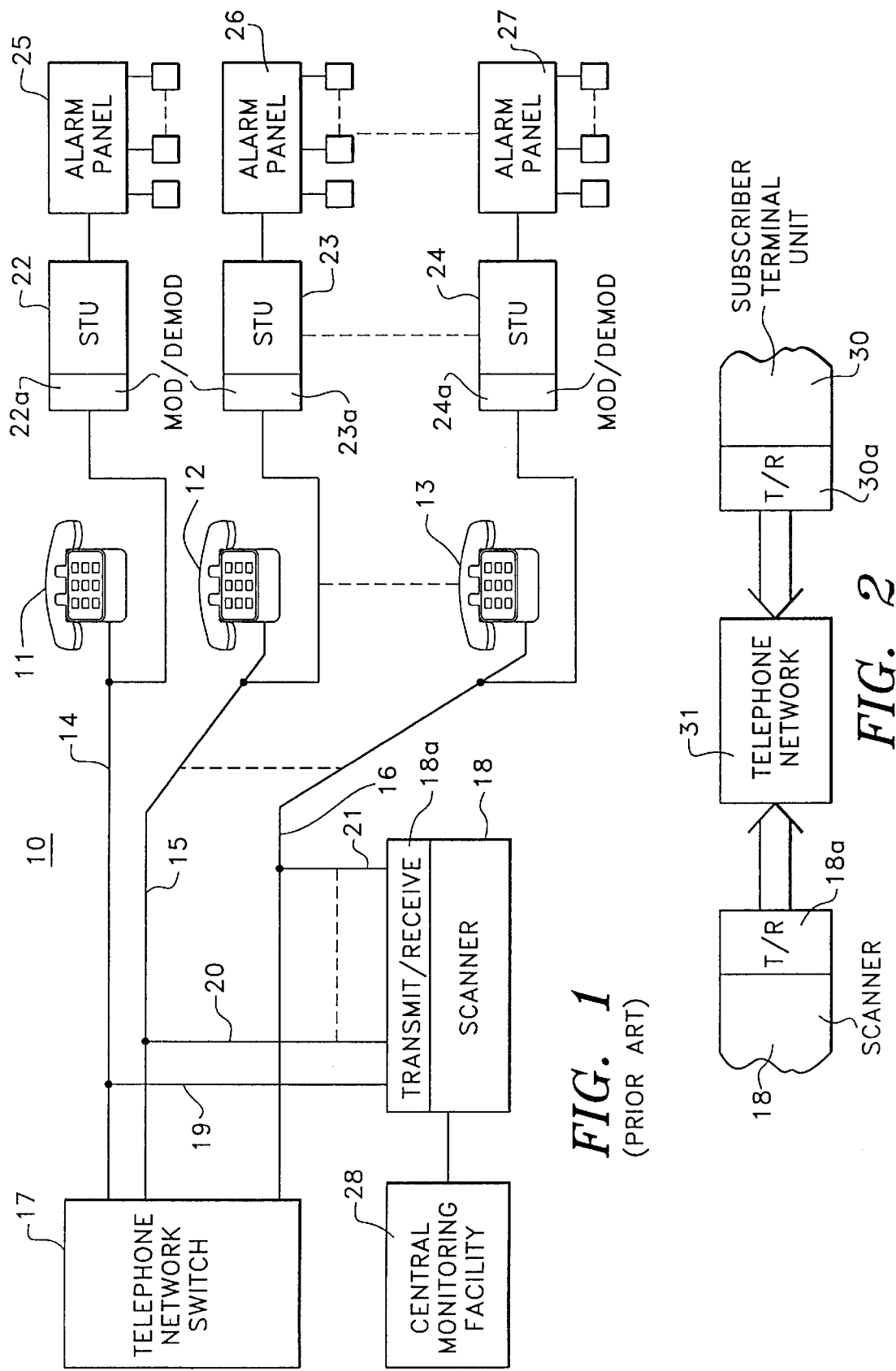

5,822,423

APPARATUS AND METHOD FOR SUPERVISING DERIVED CHANNEL COMMUNICATIONS

BACKGROUND OF THE INVENTION

The present invention generally relates to data reporting systems, and in particular, to derived channel communications associated with such systems.

A variety of data reporting systems are available to protect and/or remotely monitor residential and commercial sites. This is conventionally accomplished by placing appropriate detectors (contact switches, motion detectors, smoke detectors, fire detectors, parameter monitoring devices, etc.) at desired locations at the site to be monitored (the "subscriber's premises") and coupling the deployed detectors with an event communicating panel. The event communicating panel is configured to monitor the deployed detectors to determine the initiation of, or changes in conditions at the subscriber's premises (responsive to a change in state of one of the detectors).

In this way, the event communicating panel is made capable of monitoring the condition of the subscriber's premises, and of providing a local signal (e.g., an alarm) responsive to signals received from the deployed detectors. In most cases, it will additionally be desirable to alert a remote facility of the detected change in conditions. For example, a detected break in a contact sensor or detected movement associated with a motion detector may signify an attempted break-in at the subscriber's premises, calling for police intervention. Similarly, a detected change in state of a smoke detector or a fire detector may signify a fire, calling for intervention by a fire department. A detected change in a parameter monitoring device may signify a need to service an apparatus located at the subscriber's premises.

This is accomplished by establishing a communicating link between the event communicating panel at the subscriber's premises and a remotely stationed monitoring facility. This communicating link is preferably established by telephone due to the availability and adaptivity of telephone-based systems to the remote reporting of monitored conditions.

A basic system for accomplishing such a result establishes a one-way (so-called "unsupervised") connection between the event communicating panel and the central monitoring facility, to advise (report) the monitoring facility of any detected changes in conditions. The monitoring facility is then responsible for dispatching an appropriate response (police, fire, service, etc.). However, in practice, it has been found that such basic systems are prone to false alarms, and are easily defeated by severing the telephone connection (either intentionally, by an intruder, or through damage to the telephone system). This gave rise to the development of so-called "supervised" systems for providing added assurances of the detection of such conditions, in turn permitting a more assured response to such conditions. One such system which has found wide acceptance in the industry is the "VerSuS®" System which is presently marketed by DCX Systems, Inc. of Willow Grove, Pa. The "VerSuS®" System is also described in U.S. Pat. No. 4,442,320 (James et al.), which is incorporated by reference as if fully set forth herein.

In brief, the VerSuS® System creates a "derived channel" by coupling a "subscriber terminal unit" (STU®) with the event communicating panel and its associated detectors, which are located at each subscriber's premises, and by coupling a "scanner" with the telephone switch equipment which is located at the telephone company central office. The scanner in turn communicates with the remote monitoring facility, also using the telephone network. The scanner at the central office and the subscriber terminal units deployed at the subscribers' premises to be monitored combine to supervise the detection of signals representing changes in conditions in a way which minimizes the potential for false reports, and for compromising such systems.

To this end, the scanner operates to periodically poll (by a telephone connection) each of the subscriber terminal units located at each of the subscriber's premises to be monitored. Although various types of signals may be used for this purpose, frequency shift keyed (FSK) signals are disclosed for such in U.S. Pat. No. 4,442,320. Such polling signals are directed to the subscriber terminal unit, which monitors the event communicating panel at the subscriber's premises, to ascertain the status of the detectors located at the subscriber's premises. Such periodic polling also operates to verify the viability of the telephone connection which couples the subscriber terminal unit, and its associated event communicating panel, with the scanner. The subscriber terminal unit is additionally made capable of communicating with the scanner (i.e., two-way communications) to immediately advise of a change in condition detected at the subscriber's premises.

While such supervised communications operate to significantly improve the assurances of an effectively monitored premises, and an effectively reported change in condition, FSK signalling (and other signalling systems) occurs at a frequency which causes an audible signal to be placed on the telephone line. When the telephone at the subscriber's premises is not in use (a so-called "on-hook" condition), this does not present a problem. However, the placement of an audible signal on the telephone line is precluded by governmental regulation when the telephone at the subscriber's premises is in use (a so-called "off-hook" condition). To meet this regulatory provision while maintaining the supervisory function of the data reporting system, an alternative operating mode is employed when the telephone is off-hook and in use.

In this alternative mode, polling signals and responses in the audible frequency range are suspended, and a sub-audible tone is monitored to determine the status of the remotely stationed event communicating panel. The sub-audible tone is produced by the subscriber terminal unit, and is monitored by the scanner. The presence of the sub-audible tone indicates an absence of any changes in conditions, justifying a continued suspension of any polled responses. Upon the occurrence of a change in condition, the sub-audible tone is discontinued by the subscriber terminal unit. Upon detecting a discontinued sub-audible tone for a particular subscriber's premises, the scanner then initiates a polling sequence, inquiring into the status of the premises. This inquiry is accomplished using the same (audible) signals which are normally employed during on-hook conditions (when the telephone is not in use). However, in the presence of a potentially serious occurrence (e.g., an alarm event), governmental regulations permit audible signals to be placed on the telephone line, even though in use, and the polled response which is obtained operates to provide a positive assurance of a validly reported change in condition. The presence of the sub-audible tone during normal telephone usage additionally operates to verify the integrity of the telephone connection since suspension of the sub-audible tone (responsive to a broken line) would itself constitute a change in condition calling for appropriate action by the remote monitoring facility. The result is a positive monitoring of changing conditions during all modes of telephone usage.

The sub-audible tone suggested for use by U.S. Pat. No. 4,442,320 is a 25 Hz tone. In practice, a 36 Hz tone has been found to provide an optimum result. In either case, the tone is sub-audible and readily transmitted by conventional analog switch equipment. However, to meet the demands of present technological requirements, the trend has been to replace analog transmission equipment with digital transmission equipment (so-called "digital loop carrier systems"). As part of their operation, digital loop carrier systems convert the analog signals developed by conventional telephone equipment, including data reporting equipment, to a digital form which is better suited to transmitting larger quantities of information using the relatively limited available bandwidth of conventional telephone equipment (typically 300 to 3200 Hz). However, as part of this analog to digital conversion process, the analog signal is subjected to band pass filtering. In practice, it has been found that such filtering tends to eliminate the sub-audible (36 Hz) signal which is used for purposes of supervising data reporting equipment as previously described. This precludes the supervisory function of the sub-audible tone during off-hook telephone conditions, giving rise to the need to develop an alternative for the sub-audible tone in order to supervise derived channel data reporting systems in the presence of digital telephone network equipment.

SUMMARY OF THE INVENTION

It is therefore the primary object of the present invention to provide a supervisory signal useful with derived channel data reporting systems which is operable with digital loop carrier systems.

It is also an object of the present invention to provide a supervisory signal useful with derived channel data reporting systems which is operable with digital loop carrier systems and which will not interfere with normal telephone usage, even during off-hook telephone conditions.

It is also an object of the present invention to provide a supervisory signal useful with derived channel data reporting systems which is operable with digital loop carrier systems and which will not interfere with ancillary telephone equipment such as modems and the like.

It is also an object of the present invention to provide a supervisory signal useful with derived channel data reporting systems which is operable with digital loop carrier systems and which provides the reliability of the sub-audible tones which were previously used with analog loop carrier systems.

It is also an object of the present invention to provide a supervisory signal useful with derived channel data reporting systems which is operable with digital loop carrier systems and which provides an increased level of security for such systems.

These and other objects which will become apparent are achieved in accordance with the present invention by providing a supervisory signal which is implemented as a tone having a frequency which is capable of being transmitted by the existing telephone network equipment, but which is transmitted at an attenuated level sufficient to minimize, if not practically eliminate interference with normal telephone usage (including off-hook conditions of the telephone). Such a supervisory signal preferably has a frequency which lies outside of the conventional pass band of a digital loop carrier system, and is capable of operating in conjunction with biphase modulated (BPSK), frequency shift keyed (FSK) and multi-tone modulated (MLT) polling systems. This would include supervisory signals having a frequency of from 200 Hz to 300 Hz, with frequencies approaching 200 Hz being particularly preferred for such purposes.

Conventional digital loop carrier systems are generally considered to pass frequencies in a range from 300 to 3200 Hz. In accordance with the present invention, it has been found that even frequencies of 200 Hz to 300 Hz are effectively communicated by such systems, although at an attenuated level. Such attenuation is sufficient to avoid unsatisfactory interference with active telephone usage and telephone company signalling, yet the resulting signal is of a sufficient magnitude to be detected by the scanner of a supervised, derived channel data reporting system.

Further in accordance with the present invention, the basic supervisory tone previously used in conjunction with data reporting systems is preferably replaced with a supervisory signal capable of transmitting useful data. Added assurances of reliable reporting are provided by the transmission of active data, as distinguished from the more limited, essentially binary indication of state (i.e., tone present or absent) provided by previous supervisory tones. If desired, the data can be encrypted to still further increase the security provided by such a system.

For further detail regarding the supervisory signal of the present invention, and systems for its implementation, reference is made to the detailed description which is provided below, taken in conjunction with the following illustrations.

BRIEF DESCRIPTION OF THE DRAWINGS

FIG. 1 is a schematic illustration of a supervised, derived channel alarm reporting system suitable for implementing the improvements of the present invention.

FIG. 2 is a schematic illustration of modifications of the system of FIG. 1, for implementing the improvements of the present invention.

DETAILED DESCRIPTION OF PREFERRED EMBODIMENTS

Figure 3A:
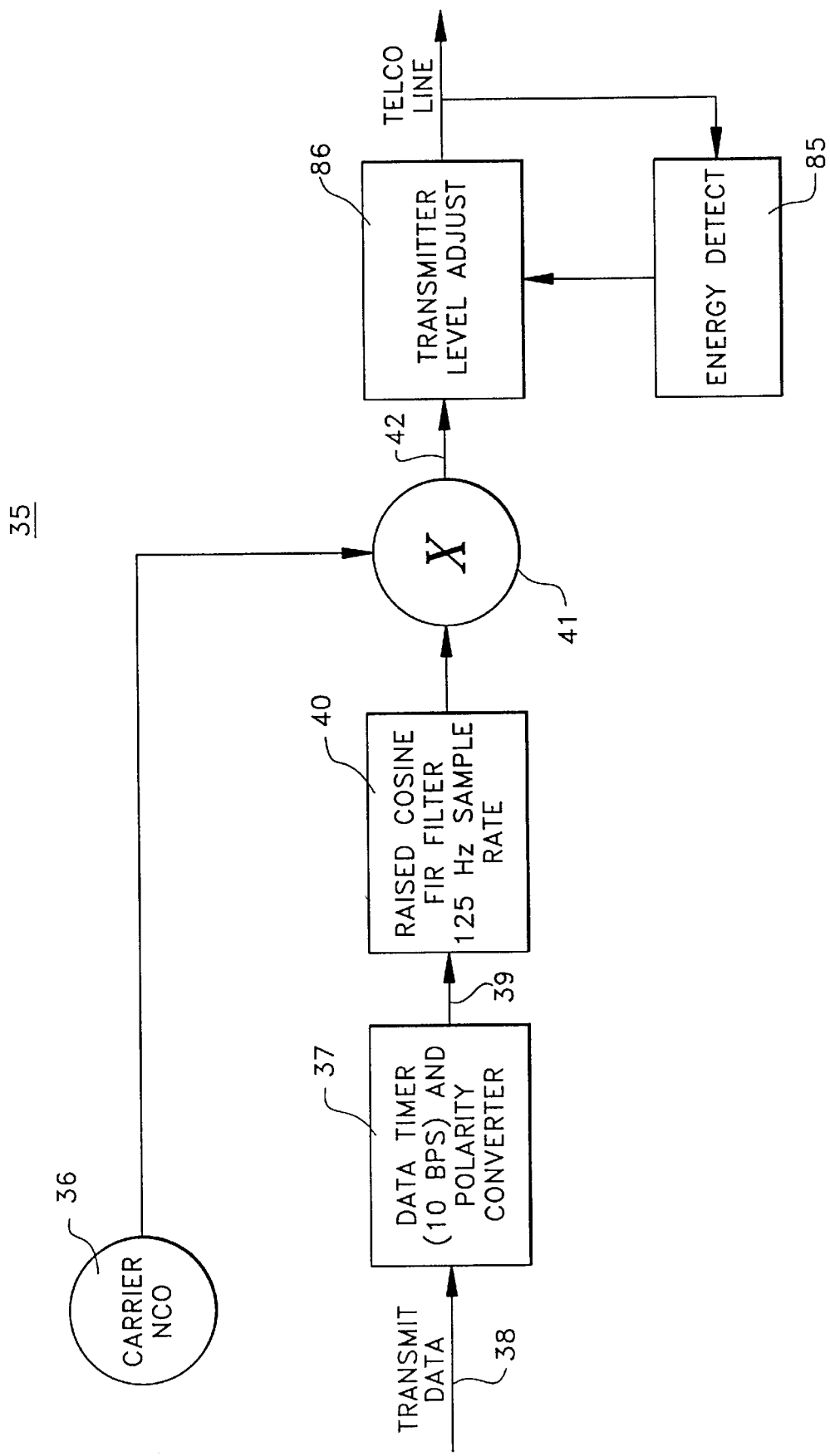
FIG. 3A is a block diagram showing transmitting portions of the system of FIG. 2, for use with biphase modulated transmissions.

The improvements of the present invention will find applicability to any of a variety of data reporting (i.e., alarm reporting and/or signal monitoring) systems, employing different event communicating panels, different data reporting facilities, and different interfacing devices. However, for purposes of illustrating the improvements of the present invention, reference will be made to the supervised derived channel system disclosed in U.S. Pat. No. 4,442,320. A detailed description of this system may be had with reference to U.S. Pat. No. 4,442,320. The following will summarize portions of the disclosed system which are pertinent to the present description, in the context of an alarm reporting system. A discussion of the system of the present invention in the context of an alarm reporting system is provided only for purposes of convenience in description, and it to be understood that corresponding improvements will be similarly achievable for other types of data reporting systems.

FIG. 1 schematically illustrates a telephone network 10 which, itself, is entirely conventional in all respects. This is desirable since alarm reporting systems in general, and the supervised derived channel system to be described below, should be compatible with all types of telephone systems and should not interfere with the use of such telephone systems.

The network 10 includes a plurality of subscriber telephone handsets (or equivalent terminations), which are respectively designated by the reference numerals 11, 12 and 13. Each of the telephones 11, 12, 13 is respectively connected to its designated local telephone line, or loop, which are respectively designated by the reference numerals 14, 15 and 16. The several telephone loops 14, 15, 16 communicate with a telephone network switch 17, which is normally located at a central office maintained by a telephone company (possibly, with the mediation of local switches for directing communications between the telephone loops 14, 15, 16 and the central office switch 17). To this point, all of the components previously described are known, and any of a variety of conventional devices may be used for their implementation. Particularly pertinent to the improvements of the present invention is that the network 10 is primarily analog in design.

Additional components are mated with the telephone network 10 to effectively interface alarm systems at the premises the subscribers to the telephones 11, 12, 13 with a central monitoring facility which is remote from the subscribers' premises and which is charged with the responsibility of monitoring the premises for alarm conditions.

To this end, a scanner 18 is provided at a convenient location for connection (the connections 19, 20, 21) to the individual subscriber telephone loops 14, 15, 16. The scanner 18 is also located at a point remote from the subscribers' premises to avoid tampering with the scanner 18. Generally, the scanner 18 will be located at the central office of the telephone company, where the telephone network switch 17 is located.

Subscriber terminal units 22, 23, 24 are additionally located at each of the subscriber's premises, and are coupled with the respective telephone loops 14, 15, 16. Each of the subscriber terminal units 22, 23, 24 in turn communicates with (interfaces with) an alarm panel 25, 26, 27, which may be any of a variety of alarm reporting systems which are presently available. Each of the alarm panels 25, 26, 27 will in turn communicate with desired sensors at the subscriber's premises, for monitoring various conditions including those pertinent to security, smoke and fire detection, and the monitoring of equipment at the subscriber's premises, as well as any other parameter, the control of which is desired by the subscribers to such services.

Each of the components previously described is known, both in its specific configuration and in its interaction with other components identified. Consequently, a further description of these components is unnecessary. However, an overview of the interactive operation of these components is appropriate to an understanding of the present invention. In conjunction with this illustrative description, it will be noted that only three telephone loops 14, 15, 16 have been shown, together with three corresponding series of telephones, subscriber terminal units and alarm panels. However, this has been done only for purposes of simplification. The actual number of systems communicating with the telephone network switch 17 and the scanner 18 will vary, and will generally be significantly greater in number.

In operation, usage of the telephones 11, 12, 13 is entirely conventional. The telephones 11, 12, 13 will remain in their dormant, so-called "on-hook" mode until such time as the use of one of the telephones 11, 12, 13 is desired. At that point, the handset will be removed from the telephone, placing the telephone in the so-called "off-hook" mode of operation. Communications will then take place across the respective telephone loop 14, 15, 16, and will be appropriately routed by the telephone network switch 17 in conventional fashion.

When the respective telephones are on-hook, and not otherwise in use (e.g., modems and the like), the scanner 18 is given a free opportunity to communicate with the subscriber terminal units 22, 23, 24, as necessary. To this end, the scanner includes a transmitting and receiving (T/R) section 18a which is capable of transmitting polling signals and receiving polled responses in accordance with a sequence of operations controlled by the scanner 18. The subscriber terminal units 22, 23, 24 are correspondingly provided with modulating and demodulating (MOD/DEMOD) sections 22a, 23a, 24a, respectively, which operate to demodulate signals received from the T/R section 18a of the scanner 18, and to respond to these signals with a modulated (encoded) reply including an indication of the condition of the various detectors associated with the alarm panel coupled with the subscriber terminal unit which is being polled.

The T/R section 18a of the scanner 18 is configured to separately receive the modulated response signals from the MOD/DEMOD sections 22a, 23a, 24a of the subscriber terminal units 22, 23, 24, completing the desired inquiry. Such polled responses are performed on a periodic basis, and preferably in sequential fashion. In this way, the scanner 18 operates to ascertain the condition of the several subscriber terminal units 22, 23, 24, and accordingly, the alarm panels 25, 26, 27 with which they are associated. The scanner 18 in turn communicates with the central monitoring facility 28 which is charged with the responsibility of monitoring the alarm panels 25, 26, 27, in accordance with the polled responses which are obtained.

A variety of different modulation techniques may be used to accomplish the inquiries (polled responses) previously described. This would include prevailing systems such as biphase modulated (BPSK), frequency shift keyed (FSK) and multi-tone modulated (MLT) systems, as well as other systems which may presently be in service or which may later be developed. However, a characteristic of these systems is that the signals sent to initiate a polled response, as well as the response which is received, will be detectable (audible) on conventional telephone equipment. When the telephones 11, 12, 13 are on-hook, this presents no difficulty since the telephone is not in use and the audible modulated signals present no interference with such use. However, when the telephones 11, 12, 13 are off-hook, and in use, these audible modulated signals will produce impermissible interference with normal telephone use (i.e., unwanted sounds on the telephone line).

For this reason, an alternative mode of operation is used to monitor subscriber premises when the subscriber's telephone is in service (off-hook). To this end, each of the subscriber terminal units 22, 23, 24 is caused to emit a sub-audible tone, which is not detectable by the user of an off-hook telephone, and operations of the T/R section 18a of the scanner 18 are suspended (disabled) to the extent that polling signals are not produced. Instead, the T/R section 18a operates to receive the sub-audible tone produced by the subscriber terminal units 22, 23, 24.

During periods when a telephone is off-hook, and the scanner 18 receives a sub-audible tone from the corresponding subscriber terminal unit, a polling signal is not initiated and polled responses are not provided. Instead, it is presumed that the alarm panel is in operation, the subscriber's loop is functioning properly, and there is no alarm condition to report. As a result, there is no interference with normal off-hook telephone usage. In the event that the scanner 18 no longer detects a sub-audible tone from a particular subscriber terminal unit, an assumption is made that either the telephone loop 14, 15, 16 has been tampered with (e.g., a cut line) or an alarmcondition has occurred (which causes the subscriber terminal unit to discontinue the sub-audible tone, responsive to the detected alarm event). In such case, the scanner 18 activates the T/R section 18a, and makes an inquiry into (polls) the status of the subscriber terminal unit responsive to its change in state (loss of the sub-audible tone). An alarm event is determined to exist (either a break in the telephone line or an actual alarm event) and the central monitoring facility 28 is appropriately notified. The operations associated with this polled response will most probably be heard by the user of the telephone which is then off-hook. However, this is permitted by governmental regulation due to the presence of an alarm condition, and is in fact considered to be beneficial since the user is, in essence, notified of a potential alarm event.

The system disclosed in U.S. Pat. No. 4,442,320 calls for the use of a sub-audible tone having a frequency of approximately 25 Hz. In the practical implementation of such a system, a frequency of approximately 36 Hz is preferably used. Such signals have worked well in performing their intended function in conjunction with the predominant analog loop carrier systems in service. This is because such frequencies are readily transmitted by such systems.

However, developments in telephone technology have led to an increased use of digital loop carrier systems. Examples of this are the D4 and SLC digital loop carrier systems which are presently employed by many telephone companies. However, as a result of filtering (band pass filtering) performed during the procedures which are used to convert the analog signals associated with many types of telephone equipment to digital form, it is a characteristic of such digital systems that a narrower band of frequencies is passed than with the prior analog systems. In particular, such digital systems are generally intended to pass frequencies of from 300 to 3200 Hz. Frequencies below 300 Hz are significantly attenuated, and frequencies below 200 Hz generally cannot be effectively detected. As a result, conventional sub-audible tones on the order of 36 Hz will not be effectively communicated by a digital loop carrier system.

In accordance with the present invention, the sub-audible tones useful in conjunction with analog systems are replaced with tones which are capable of being transmitted by a digital loop carrier system, and which are capable of being detected by derived channel equipment such as the subscriber terminal units 22, 23, 24 previously described (with suitable modifications). To this end, signals having a frequency of from 200 Hz to 300 Hz are preferred. Continuous signals, and signals with frequencies approaching 200 Hz are particularly preferred for such purposes since for a given signal level, such signals have been found to occupy the lowest possible band width, and to be the least audible. In practice, such frequencies produce signals which do not materially interfere with normal (off-hook) telephone usage, yet which are of a sufficient amplitude to be detected by the remotely stationed scanner 18. As a result, the foregoing functions of a supervised alarm reporting system are preserved in the presence of a digital loop carrier system.

The improvements of the present invention can be accomplished with minimal modifications to the prior system illustrated in FIG. 1. Referring to FIG. 2, the scanner 18 retains a T/R section 18a, although the T/R section 18a is modified from the prior configuration as will be discussed more fully below. A subscriber terminal unit 30 is provided which is substantially similar in configuration to the subscriber terminal units 22, 23, 24 of FIG. 1, except that the MOD/DEMOD sections 22a, 23a, 24a are replaced with a transmitting and receiving (T/R) section 30a. The scanner 18 and the subscriber terminal unit 30 communicate over a telephone network 31 (which may be analog or digital in operation) in similar fashion to the communications discussed in conjunction with the prior embodiment of FIG. 1. Such communications are implemented by the T/R sections 18a, 30a, as follows.

FIG. 3A shows a transmitter 35 for use with biphase modulated communications (BPSK). The transmitter 35 will form part of the T/R section 18a of the scanner 18 and part of the T/R section 30a of the subscriber terminal unit 30, permitting two-way communications between these two components. The BPSK functions to be performed are preferably implemented with a microprocessor configured for digital signal processing (DSP). While similar functions may be implemented using other techniques, including digital and analog circuit designs, the use of a DSP microprocessor is presently considered preferred due to its versatility (making the resulting system largely independent of hardware). To this end, and using techniques which are themselves known, the BPSK transmitter 35 is caused to implement the functions which follow. To be noted is that the specific parameters associated with the following circuits (including voltage level, frequency and sample rate) are provided for purposes of illustration, and can be varied to suit a particular application, as desired (responsive to programming of the DSP microprocessor).

A numerically controlled oscillator 36 (NCO) is provided to develop a desired carrier frequency. Presently preferred frequencies for implementing this carrier signal include 210 Hz, 230 Hz, 250 Hz and 270 Hz. A "sine table" look-up method is used to control the phase of this carrier signal. An input data timer 37 is provided which includes a polarity converter and which serves as an input for the data 38 which is to be transmitted over the telephone network 31. A data rate of 10 bits per second (BPS) is presently considered preferred for such purposes. The input data timer 37 operates to cause changes in the data received responsive to detected transitions (0 to 1, 1 to 0) in the signal 38, preferably producing a bipolar swing (+1 to −1) as opposed to a unipolar transition. The resulting output, at 39, is then applied to a "raised cosine" pulse shaping filter 40. To this end, the bipolar data signal 39 is preferably passed through a finite impulse response (FIR) linear phase filter to minimize inter-symbol interference (ISI) at the receiver (to be described below). The filter 40 is preferably implemented at a sample rate of 125 Hz. The output of the NCO 36 and the FIR filter 40 are combined in a modulator, at 41. To this end, the filtered data signal is multiplied by the carrier signal to produce a modulated transmission carrier signal, at 42.

Figure 3B:
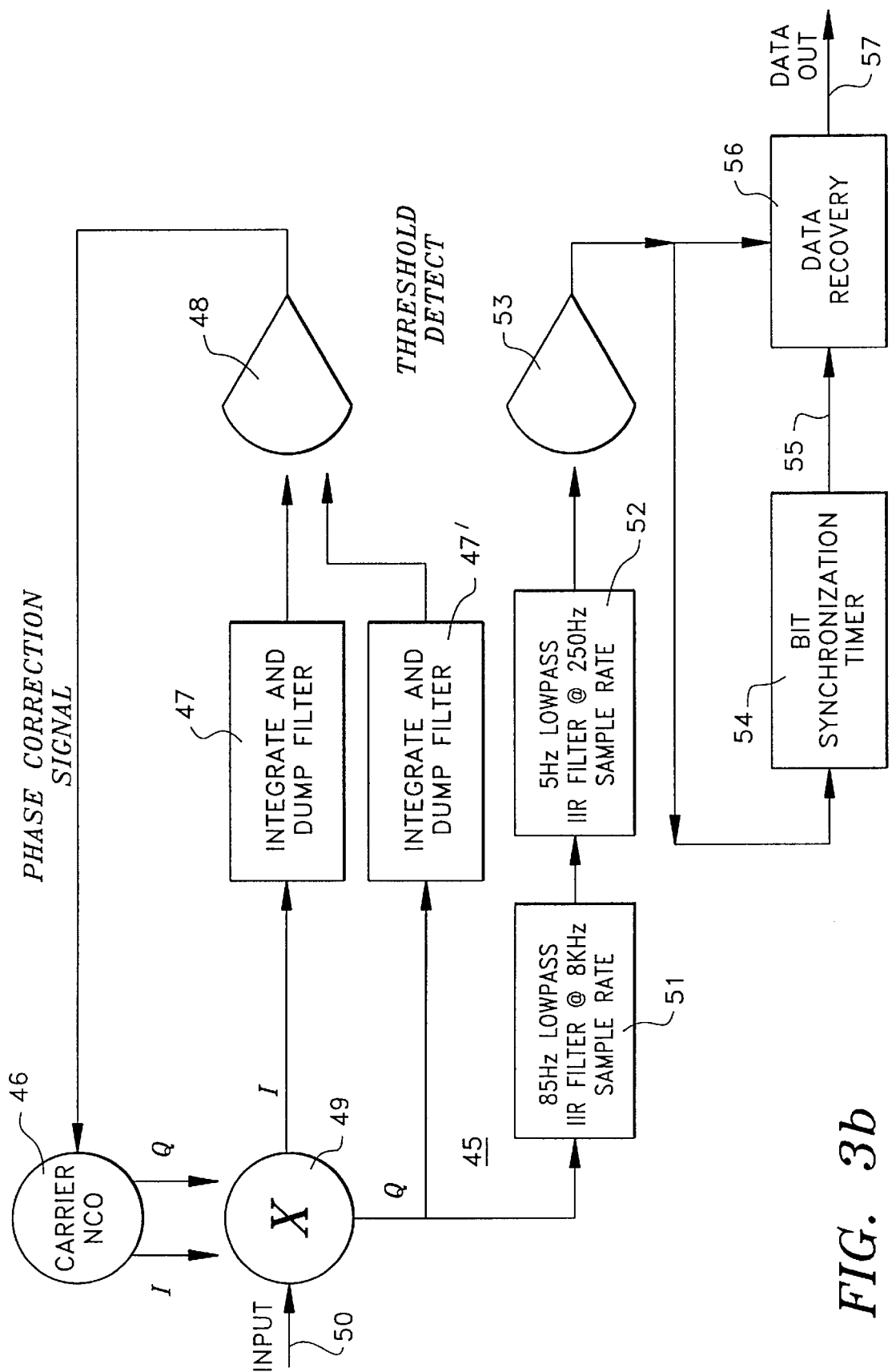
FIG. 3B is a block diagram showing receiving portions of the system of FIG. 2, for use with biphase modulated transmissions.

FIG. 3B shows a receiver 45 for use with the BPSK transmitter 35 of FIG. 3A, to filter and demodulate the transmitted signal. The receiver 45 will also form part of the T/R section 18*a* of the scanner 18 and part of the T/R section 30*a* of the subscriber terminal unit 30, complementing the operations of the opposing transmitter (of the subscriber terminal unit 30 and the scanner 18, respectively). The receiver 45 is also preferably implemented with a DSP microprocessor, and performs the functions which follow. The specific parameters associated with the following circuits are again provided for purposes of illustration, and can be varied to suit a particular application, as desired.

A numerically controlled oscillator 46 (NCO) is controlled by the output of an integrate and dump filter 47, which operates in conjunction with a threshold detection circuit 48. The resulting signal is multiplied (multiplexer 49) with the received (input) signal 50, producing in-phase (I) and quadrature (Q) components. This operates to maintain synchronization between the input signal 50 and the resident oscillator 46.

The phase constellation of the resulting signal consists of two points. However, only one phase component is processed to extract the data. To this end, the Q signal is introduced to a second integrate and dump filter 47', and to a low pass filter 51. The integrate and dump filter 47' communicates with the threshold detection circuit 48, and operates to assist in removing the effects of in-band (e.g., voice) energy present in the signal (removing more of these effects than would a single loop system). In its preferred embodiment, the filter 51 is an 85 Hz low pass, infinite impulse response (IIR) filter operating at a primary sample rate of 8 KHz. The filtered signal is further introduced to a low pass filter 52, which operates at a lower rate to extract the original (10 BPS, 5 Hz) data from the input signal 50. To this end, a 5 Hz low pass infinite impulse response (IIR) filter operating at a sample rate of 250 Hz is preferred. The resulting signal is then tested against a threshold (threshold detector 53) and processed by a bit synchronization timer 54 (internal synchronization seeking finite 1-0 transitions) to produce an output bit stream 55. The output bit stream 55 is then assembled, at 56, by a known data recovery function (which may include suitable data error detection, if desired), yielding the desired data output at 57.

Figure 4A:
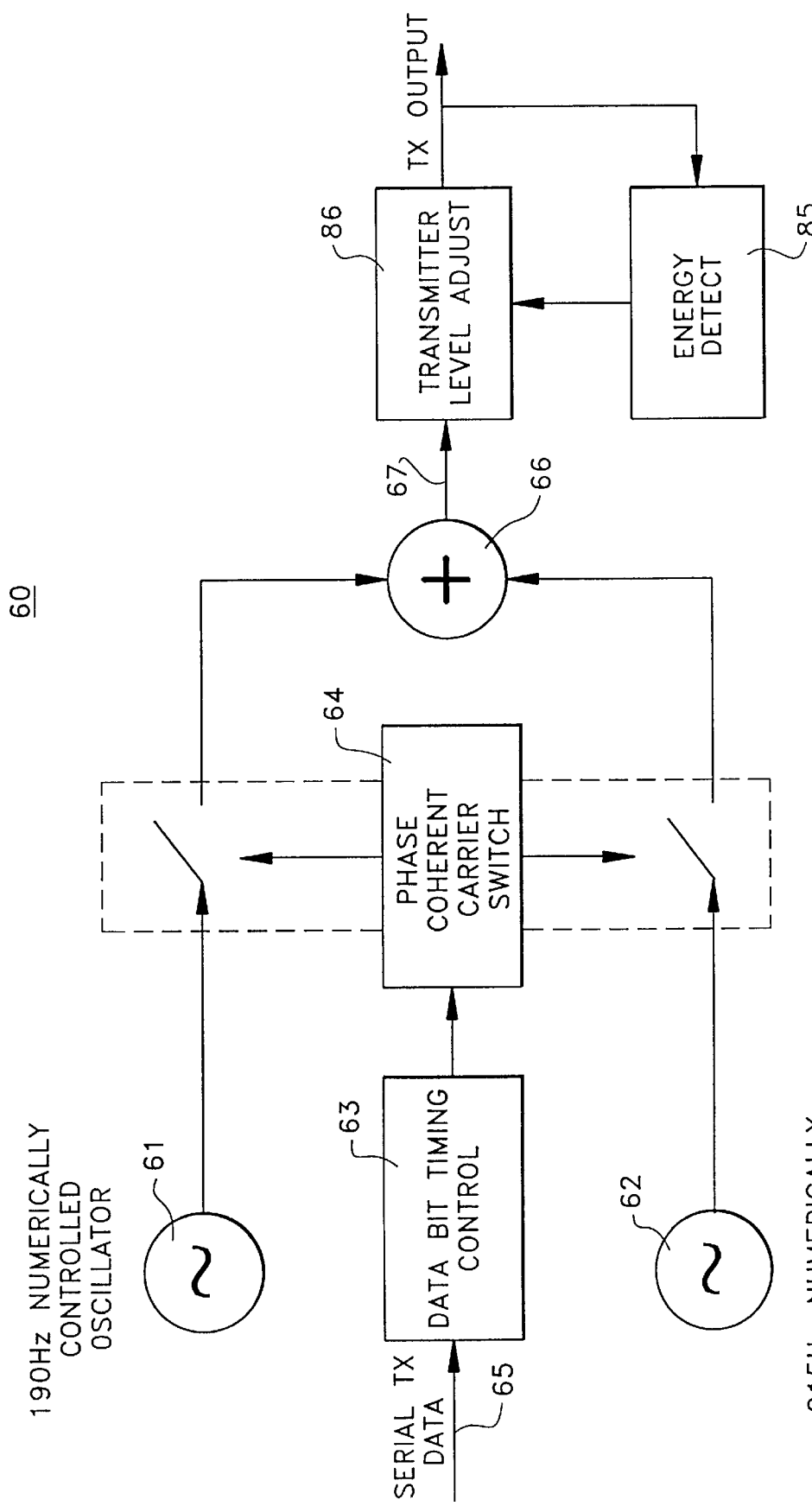
FIG. 4A is a block diagram showing transmitting portions of the system of FIG. 2, for use with frequency shift keyed transmissions.

FIG. 4A shows a transmitter 60 for use with frequency shift keyed (FSK) communications. The transmitter 60 will form part of the T/R section 18*a* of the scanner 18 and part of the T/R section 30*a* of the subscriber terminal unit 30, permitting two-way communications between these two components. The FSK functions to be performed are again preferably implemented with a microprocessor configured for digital signal processing (DSP). While similar functions may be implemented using other techniques, including digital and analog circuit designs, the use of a DSP microprocessor is presently considered preferred due to its versatility (making the resulting system largely independent of hardware). To this end, and again using techniques which are themselves known, the FSK transmitter 60 is caused to implement the following functions. To be noted is that the specific parameters associated with the following circuits (including voltage level, frequency and sample rate) are again provided for purposes of illustration, and can be varied to suit a particular application, as desired (responsive to programming of the DSP microprocessor).

Two numerically controlled oscillators 61, 62 (NCO) are provided to develop each of the two frequencies used for FCES modulating the output signal. Currently preferred frequencies for this purpose include 190 Hz and 215 Hz, respectively. A "sine table" look-up method is again used to control the phase of each of the carrier signals. An input data timer 63 is combined with a phase coherent carrier switch 64. As transitions in the data received at 65 are detected, the carrier frequency is switched from mark (1=215 Hz) to space (0=190 Hz) responsive to operations of the phase coherent carrier switch 64. The phasing must be coherent to minimize harmonics produced by the instantaneous changes in carrier frequency which result. The switched signals are summed at 66, developing an output transmission carrier signal at 67. The carrier signal 67 may be digitally filtered to minimize harmonic transmissions, if desired.

Figure 4B:
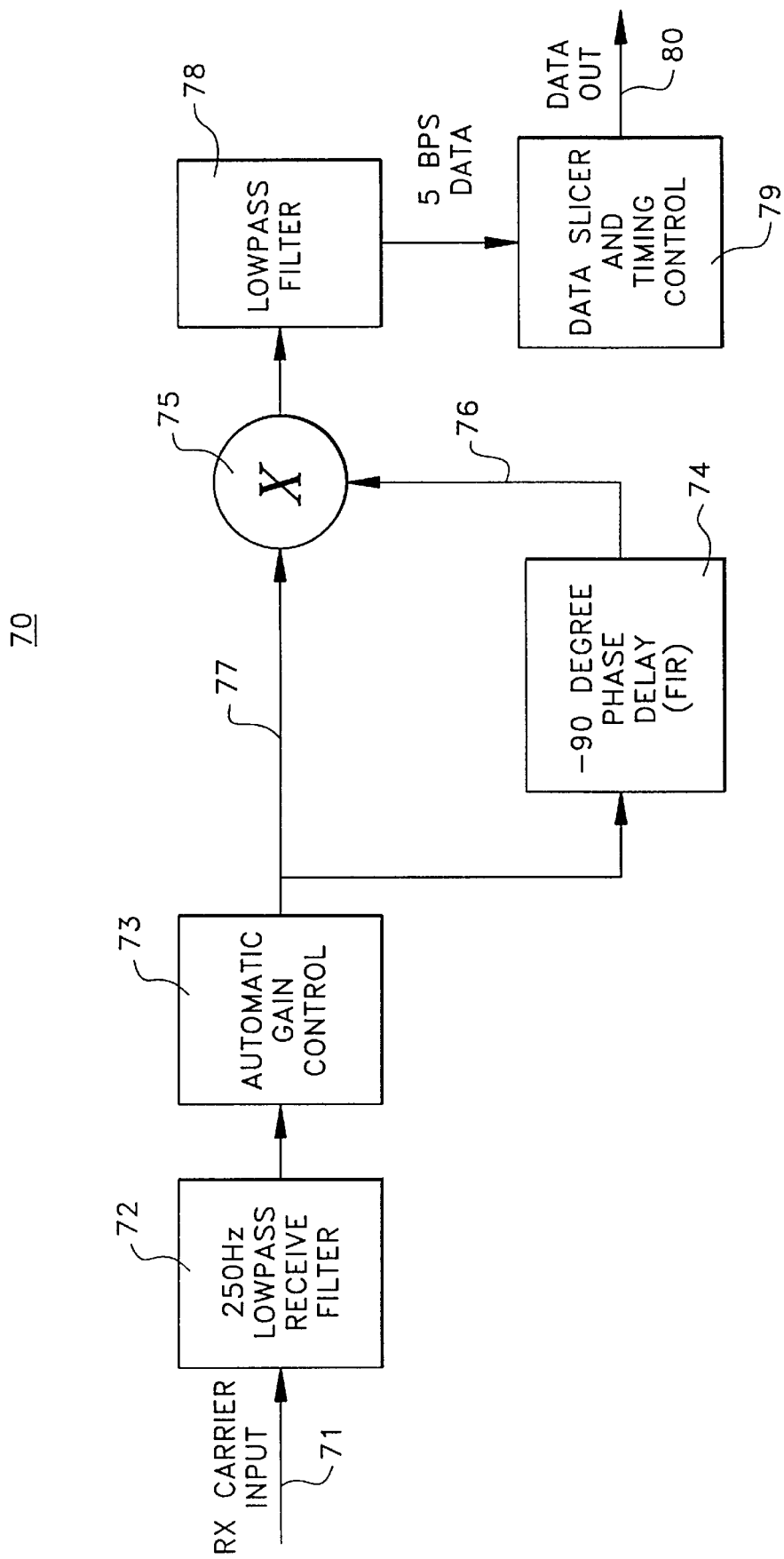
FIG. 4B is a block diagram showing receiving portions of the system of FIG. 2, for use with frequency shift keyed transmissions.

FIG. 4B shows a receiver 70 for use with the FSK transmitter 60 of FIG. 4A, to filter and demodulate the transmitted signal. The receiver 70 will also form part of the T/R section 18*a* of the scanner 18 and part of the T/R section 30*a* of the subscriber terminal unit 30, complementing the operations of the opposing transmitter (of the subscriber terminal unit 30 and the scanner 18, respectively). The receiver 70 is also preferably implemented with a DSP microprocessor, and performs the functions which follow. The specific parameters associated with the following circuits are again provided for purposes of illustration, and can be varied to suit a particular application, as desired.

A low pass (preferably 250 Hz) filter operates to receive a carrier input 71, primarily for the purpose of rejecting speech and other signals outside of the range of the input FSK signal. The filtered signal is then introduced to an automatic gain control (AGC) circuit 73, to set the received carrier signal level to a known range. This is done to simplify the data decision process which is to take place downstream. The resulting signal is then delayed by 90 degrees, preferably by using a zero (FIR) filter 74 in combination with a multiplexer 75. The delayed signal 76 is multiplied with the signal 77 received from the AGC 73, essentially performing an auto-correlation function. The resulting (correlated) signal is then introduced to a low pass filter 78, to remove higher frequency components, yielding the desired data. The yielded data bit stream (5 BPS) is then introduced to a data slicer and timing control circuit 79, for extracting the output data, at 80, and for checking the timing of the output data 80 (which may include suitable data error detection, if desired).

It will be understood that various changes in the details, materials and arrangement of parts which have been herein described and illustrated in order to explain the nature of this invention may be made by those skilled in the art within the principle and scope of the invention as expressed in the following claims. As previously indicated, implementation of the foregoing functions, and the specific means for doing so, may be varied as desired, and may be associated with systems for reporting alarm conditions as well as other conditions requiring remote monitoring, such as the remote monitoring of specified parameters. Also capable of variation is the type of data communicating function used, which may itself call for suitable variation of the foregoing operations. Other, additional functions may be provided where desired to achieve a particular result.

For example, the system of the present invention relies on a transmission of signals at a relatively low level (e.g., on the order of −35 to −40 dBm) to minimize the audibility of the supervisory (200 to 300 Hz) signal placed on the telephone line. However, a signal of this magnitude is prone to detection error in the presence of speech or other signals on the carrier. To reduce such error while avoiding unnecessary interference with telephone usage, the T/R section 18*a* of the scanner 18 and the T/R section 30*a* of the subscriber terminal 30 may be provided with means for dynamically adjusting the level of the transmitted supervisory signal responsive to the presence or absence of additional signals on the line due to operations of the telephone network 31.

Referring to the transmitters 45, 70 of FIGS. 3A and 4A, such dynamic adjustment is preferably performed responsive to an energy detector 85, which communicates with the output of the transmitter to determine the level of signals present on the telephone line. The energy detector 85 communicates with a level adjusting circuit 86 capable of increasing and decreasing the level of the transmitted signal responsive to corresponding increases and decreases in the energy level detected on the telephone line. Such means are themselves known, and are not unlike the dynamic adjustment means used with cellular telephone networks to dynamically adjust signal levels responsive to changes in the distance of the mobile site from the communicating cell site (i.e., an automatic gain control).

Dynamic adjustment of the transmitted signal has the advantage that a supervisory signal with an increased (stronger) signal level will not be noticed in the presence of speech or the like, and will offer a signal of increased level for detection by the derived channel system (improving receiver performance and lowering the bit error rate). However, the level of the supervisory signal would be reduced during quiet periods, to avoid interference with normal telephone usage. Similar benefits can be achieved by adjusting the frequency of the supervisory signal (between 200 Hz and 300 Hz) responsive to changes in the carrier signal, either alone or in conjunction with a dynamic adjustment of signal level, to obtain the least audible signal possible. Dynamic frequency control would also be useful in cases where two subscribers in communication with one another each have a subscriber terminal unit 30 in accordance with the present invention, to minimize the potential for interference with normal telephone usage (resulting from the cumulative effects of two carrier signals having the same, or similar frequencies).

The relatively low level signals (−35 to −40 dBm) used to minimize the audibility of the supervisory signal of the present invention can also adversely effect the ability of the system to determine the hook status condition of the subscriber's telephone, to in turn determine the operating mode for the system. For this reason, the system of the present invention preferably does not utilize a high impedance source for detecting changes in amplitude to indicate hook status condition, as did the prior system of FIG. 1. Instead, the hook status condition of the subscriber's telephone is preferably detected by the subscriber terminal unit (at the subscriber's premises), and communicated to the scanner as part of the response message produced by the subscriber terminal unit. This poll/response protocol may also be used to identify losses in communications with the scanner, to allow the subscriber terminal unit to establish an alternative communications path (e.g., a cellular back-up system) responsive to such conditions (to provide an added measure of security).

Under normal conditions, the system of the present invention should not interfere with normal voice communications (including telephone company signalling such as DTMF, MF and call progress signals, among others), or with other (e.g., data) communications associated with the telephone network. However, in the event that the system of the present invention causes interference with a particular instrumentality, the T/R section 18a of the scanner 18 and the T/R section 30a of the subscriber terminal unit 30 may be provided with means for recognizing activity corresponding to the instrumentality in question, for discontinuing operations of the system of the present invention (i.e., polling and/or supervisory signaling) pending such operations. For example, let it be assumed that the system of the present invention in some way interferes with a data transmission function. Suitable means would be provided to detect such data transmissions (e.g., equivalent to the energy detection circuit 85), and in such case, suitable means would be provided to suspend further operations of the system of the present invention (e.g., equivalent to the level adjusting circuit 86, set to zero). This would allow the data transmissions to proceed in an uninterrupted fashion, and operations of the system of the present invention would only have to be discontinued for a limited period of time (while the data transmissions are in progress), minimizing down-time of the associated alarm reporting system. For added security, steps can be taken to immediately initiate an inquiry (a polled response or a verification of the presence of the supervisory signal) following discontinuance of the interfering event. This is considered useful to immediately ascertain the status of the remote premises, while minimizing the potential for any loss of data. As an alternative to the discontinuance of system functions, the transmission of short signal bursts capable of fitting within the timing requirements for the scanner could also be used to minimize system interference.

The supervisory signal of the present invention is capable of being implemented as a basic tone, providing operations similar to those of the previously used 36 Hz supervisory tone. However, and further in accordance with the present invention, the supervisory signal is preferably implemented as a data carrying signal. Two-way communications containing data including identification codes, status conditions and an indication of present hook status conditions are particularly preferred for such purposes. In addition to the increased information exchangeable with such a system, tampering with the resulting system is further minimized. For example, attempts have been made to tamper with such systems by substituting a circuit for a subscriber terminal unit, and by causing the substituted circuit to emit a signal simulating an absence of any alarm conditions. Such substitution would be precluded by the change in the associated identification codes which would then result. Still further increases in security would be achievable by encrypting such transmissions.

The following is a preferred protocol for implementing such a supervisory signal for biphase modulated (BPSK) communications, it being understood that a similar supervisory signal may be implemented for other types of communications using similar techniques. To this end, the data is preferably transmitted in packets between the scanner 18 and the subscriber terminal unit 30. The data is modulated using biphase shift keying (BPSK) at a bit rate of between 10 and 80 bits per second. It is desirable to minimize the bit rate to occupy less bandwidth (e.g., 10 bps). However, the use of higher bit rates (e.g., 80 bps), transmitted in short bursts that can be randomized, is most effective when the avoidance of interference between plural scanners and/or subscriber terminal units is of particular concern. The carrier frequencies preferably used for 10 bps data transmission include 210 Hz, 230 Hz, 250 Hz, 270 Hz and 290 Hz. As an example, at an 80 bps data rate, the scanner and the subscriber terminal unit would both preferably transmit and receive on a 250 Hz carrier.

Two forms of data packets are preferably used by the system to optimize re-synchronization time when interference occurs. A standard packet format operates as a default on a poll (scanner) and response (subscriber terminal unit) basis. A condensed packet format is used after communications have been lost for some pre-determined period of time.

For example, the condensed packet format could be transmitted continuously by the scanner or the subscriber terminal unit during negotiation of the previously described changes in carrier frequency.

The standard data packet includes 32 or 40 bits, implemented as shown in Table 1. A brief carrier synchronization period is transmitted prior to the data if the carrier is not continuous.

TABLE 1

| Number of Bits | 8 | 4 | 4 | 3 | 5 | 8 | 8 |
|---|---|---|---|---|---|---|---|
| Packet Item | [SYNC1] | [FLAGS] | [SID/HID] | [MSG TYPE] | [SEQ] | [DATA] | [CRC] |
| | | | | | | (optional) | |

SYNC1 - Standard packet sync byte (10101000)
FLAGS - [Encrypt] [Acknowledge] [Hook Status] [Alarm Status]
  Encrypt = 1, the message is encrypted, 0 = nonencrypted
  Acknowledge = 1 - the last message was received without error
        0 - the last message had errors
  Hook Status = 1, line off-hook (subscriber terminal unit only)
  Alarm Status = 1, alarm condition true (subscriber terminal unit only)
SID/HID - Four bit pointer into the soft identification (SID), if
      originating from the scanner; and into the hard identification
      (HID) if originating from the subscriber terminal unit.
      This pointer is used to determine part of the encryption key.
MSG TYPE - Three bit field (TBD) that identifies the message type.
    Message types to be defined include:
    1) Upload Hard Identification
    2) Upload Soft Identification
    3) Download Encryption Key
    4) Standard Status Query
SEQ - Sequence number. For message types that require multiple byte
    transfers, the sequence number will be used for flow control. For
    status query messages that do not contain data, a random number
    will be inserted to ensure constant scrambling of the data by the
    encryption algorithm.
DATA - An eight bit data field used by commands that transfer information
    between the scanner and the subscriber terminal unit. This byte
    is not transmitted when the message type is a status query.
CRC - Eight bit cyclic redundancy checkword calculated over all message
    bytes. Standard CRC = 8 is used for error detection in messages
    (calculated after encryption).

The condensed data packet includes 24 bits, implemented as shown in Table 2. A brief carrier synchronization period is transmitted prior to the data if the carrier is not continuous. This packet is used for faster re-synchronization after a loss of communications.

TABLE 2

| Number of Bits | 8 | 4 | 4 | 8 |
|---|---|---|---|---|
| Packet Item | [SYNC1] | [FLAGS] | [SID/HID] | [CRC] |

SYNC1 - Standard packet sync byte (10101011)
FLAGS - [Encrypt] [Acknowledge] [Hook Status] [Alarm Status]
  Encrypt = 1, the message is encrypted, 0 = nonencrypted
  Acknowledge = 1 - the last message was received without error
        0 - the last message had errors
  Hook Status = 1, line off-hook (subscriber terminal unit only)
  Alarm Status = 1, alarm condition true (subscriber terminal unit only)
SID/HID - Ignored in condensed packet mode.
CRC - Eight bit cyclic redundancy checkword calculated over all message
    bytes. Standard CRC = 8 is used for error detection in messages
    (calculated after encryption).

To maintain a higher level of security, a random 16 bit soft encryption key is preferably periodically updated in the subscriber terminal unit. The four bit SID/HID in the message packet is used as a pointer into the internal identification (ID) so that the identification (ID) can be used as half of the encryption key. The pointer specifies the starting bit where the identification (ID) begins. This re-ordered identification is then concatenated to the 16 bit soft key.

In addition to the supervisory signal of the present invention, a hook status carrier signal is additionally useful in allowing a faster detection of changes in hook status and alarm conditions. As an example, this would be useful in applications where the reporting system requires a detection of changes in hook status conditions at a rate that may be faster than the data packet transmission rate. To this end, a tone (e.g., 310 Hz) is generated by the subscriber terminal unit. This tone is transmitted continuously when the subscriber's telephone is on-hook. However, in the off-hook condition, no tone is transmitted. Hook status conditions are detected by the subscriber terminal unit, by monitoring transmitted signal levels. In the event of an alarm (on-hook or off-hook condition), the tone is preferably pulsed on and off at a 200 millisecond repetition rate (regardless of hook status). The level of this signal is preferably between -25 and -15 dBm.

What is claimed is:

1. A system for providing communication between a central location and instrumentalities other than a conventional telephone located at premises of telephone network subscribers, comprising:

means for selectively transmitting signals from the central location to different subscriber premises using a telephone signal communicating network;

means located at the subscriber premises, connected to the telephones and responsive to the transmitted signals, for retransmitting signals from the subscriber premises to the central location in an audible telephone frequency range and indicative of states of the instrumentalities, using the telephone signal communicating network;

means for transmitting a supervisory signal from each of the subscriber premises to the central location, when the instrumentalities at the subscriber premises are in a first predetermined state, wherein the supervisory signal has a frequency which is transmitted by telephone signal communicating networks including digital transmission equipment having band pass filtration means which pass signals limited to the audible telephone frequency range, and wherein the supervisory signal is transmitted at an attenuated level; and means responsive to one of the instrumentalities at an individual subscriber's premises assuming a second predetermined state, for interrupting the transmission of the supervisory signal.

2. The system of claim 1 wherein the telephone signal communicating network includes digital transmission equipment having band pass filtration means associated therewith.

3. The system of claim 1 wherein the supervisory signal is transmitted from the subscriber premises during both on-hook and off-hook conditions of the telephone at the subscriber premises.

4. The system of claim 1 which further includes means for taking an event-responsive action at the central location responsive to interruption of the supervisory signal.

5. The system of claim 1 wherein the supervisory signal is at a frequency of from 200 Hz to 300 Hz.

6. The system of claim 1 wherein each of the subscriber premises are separately connected to the central location, and which further includes multiplexing means for selectively applying the transmitted signals to different subscriber premises, individually and in predetermined sequence, and for selectively receiving the responsive signals from the instrumentalities at a same one of the subscriber premises, in the same predetermined sequence.

7. The system of claim 1 which further includes means for sensing discontinuance of the supervisory signal, and means responsive to the means for sensing the discontinuance of the supervisory signal, for transmitting the signals from the central location to the individual subscriber's premises.

8. The system of claim 1 wherein the transmitted signals are biphase modulated signals.

9. The system of claim 1 wherein the transmitted signals are frequency shift keyed signals.

10. The system of claim 1 wherein the transmitted signals are multi-tone modulated signals.

11. The system of claim 1 which further includes means for sensing the signals which are communicated between the central location and the subscriber premises, wherein the communicated signals have a level which is continuously variable between a minimum level and a maximum level, and means for dynamically adjusting the level of the supervisory signal responsive to increases and decreases in the sensed level of the communicated signals.

12. The system of claim 1 which further includes means for sensing the signals which are communicated between the central location and the subscriber premises, wherein the communicated signals have a level which is continuously variable between a minimum level and a maximum level, and means for dynamically adjusting the frequency of the supervisory signal responsive to increases and decreases in the sensed level of the communicated signals.

13. The system of claim 1 which further includes means for sensing the signals which are communicated between the central location and the subscriber premises, wherein the communicated signals have a level which is continuously variable between a minimum level and a maximum level, and means for dynamically adjusting the level and frequency of the supervisory signal responsive to increases and decreases in the sensed level of the communicated signals.

14. The system of claim 1 which further includes means for sensing activation of telephone equipment other than the telephones at the subscriber premises, and means responsive to the activation sensing means for temporarily interrupting communications between the central location and the subscriber premises.

15. The system of claim 1 wherein the band pass filtration means associated with the digital transmission equipment of the telephone signal communicating network passes frequencies in a range from 300 to 3200 Hz.

16. The system of claim 1 which further includes means for sensing off-hook conditions of the conventional telephone at the individual subscriber's premises, and means responsive to the sensing means for inhibiting transmissions of the signals from the central location to the individual subscriber's premises.

17. The system of claim 16 wherein the means located at the subscriber premises include means for advising the central location of hook status conditions of the telephones at the subscriber premises.

18. The system of claim 17 wherein the advising means is a carrier signal, separate from and in addition to the supervisory signal, at a frequency transmitted by the telephone signal communicating network.

19. The system of claim 18 wherein the carrier signal is only transmitted when the telephone at the individual subscriber's premises is on-hook, and when the instrumentalities assume the second predetermined state.

20. The system of claim 16 wherein the supervisory signal is transmitted from the subscriber premises during the off-hook conditions of the telephones at the subscriber premises.

21. The system of claim 16 wherein the supervisory signal is transmitted from the subscriber premises during both on-hook and the off-hook conditions of the telephones at the subscriber premises.

22. The system of claim 16 which further includes means for sensing discontinuance of the supervisory signal during the sensing of the off-hook condition at the individual subscriber's premises, and means responsive to the means for sensing the discontinuance of the supervisory signal, for transmitting the signals from the central location to the individual subscriber's premises.

23. The system of claim 16 which further includes means for sensing discontinuance of the off-hook condition of the telephone at the individual subscriber's premises, and means responsive to the means for sensing the discontinuance of the off-hook condition, for transmitting the signals from the central location to the individual subscriber's premises.

24. The system of claim 23 wherein the means for sensing the discontinuance of the off-hook condition is associated with the means located at the subscriber premises.

25. A system for providing communication between a central location and instrumentalities other than a conventional telephone located at premises of telephone network subscribers, comprising:

means for selectively transmitting signals from the central location to different subscriber premises using a telephone signal communicating network;

means located at the subscriber premises, connected to the telephones and responsive to the transmitted signals, for retransmitting signals from the subscriber premises to the central location in an audible telephone frequency range and indicative of states of the instrumentalities, using the telephone signal communicating network;

means for transmitting a supervisory signal having a frequency capable of transmission using the telephone signal communicating network and an attenuated level, from each of the subscriber premises to the central location, when the instrumentalities at the subscriber premises are in a first predetermined state, wherein the supervisory signal is a data containing series of bits; and means responsive to one of the instrumentalities at an individual subscriber's premises assuming a second predetermined state, for interrupting the transmission of the supervisory signal.

26. The system of claim 25 wherein the supervisory signal is an encrypted signal.

27. The system of claim 25 wherein the data containing series of bits includes an identification code corresponding to the means located at the individual subscriber's premises.

28. The system of claim 25 wherein the means located at the subscriber premises include means for advising the central location of hook status conditions of the telephones at the subscriber premises, and wherein the data containing series of bits communicates the hook status conditions of the telephones at the subscriber premises to the central location.

29. The system of claim 25 wherein the means located at the subscriber premises include means for remotely monitoring equipment at the subscriber premises, and wherein the data containing series of bits communicates data associated with the remotely monitored equipment between the subscriber premises and the central location.

30. The system of claim 25 wherein the data containing series of bits establishes two-way communications between the central location and the subscriber premises.

31. A method for communicating between a central location and instrumentalities other than a conventional telephone located at premises of telephone network subscribers, comprising the steps of:

selectively transmitting signals from the central location to different subscriber premises using a telephone signal communicating network;

retransmitting signals from the subscriber premises to the central location, using the telephone signal communicating network and responsive to the transmitted signals, wherein the retransmitted signals are in an audible telephone frequency range and are indicative of states of the instrumentalities;

transmitting a supervisory signal having a frequency which is transmitted by telephone signal communicating networks including digital transmission equipment having band pass filtering which passes signals limited to the audible telephone frequency range, and an attenuated level, from each of the subscriber premises to the central location, when the instrumentalities at the subscriber premises are in a first predetermined state; and interrupting the transmission of the supervisory signal responsive to one of the instrumentalities at an individual subscriber's premises assuming a second predetermined state.

32. The method of claim 31 wherein the telephone signal communicating network includes digital transmission equipment having band pass filtration means associated therewith.

33. The method of claim 31 which further includes the step of transmitting the supervisory signal from the subscriber premises during both on-hook and off-hook conditions of the telephone at the subscriber premises.

34. The method of claim 31 which further includes the step of taking an event-responsive action at the central location responsive to interruption of the supervisory signal.

35. The method of claim 31 wherein the supervisory signal is at a frequency of from 200 Hz to 300 Hz.

36. The method of claim 31 wherein each of the subscriber premises are separately connected to the central location, and which further includes the steps of selectively applying the transmitted signals to different subscriber premises, individually and in predetermined sequence, and selectively receiving the responsive signals from the instrumentalities at a same one of the subscriber premises, in the same predetermined sequence.

37. The method of claim 31 which further includes the steps of sensing discontinuance of the supervisory signal, and transmitting the signals from the central location to the individual subscriber's premises responsive to sensing the discontinuance of the supervisory signal.

38. The method of claim 31 wherein the transmitted signals are biphase modulated signals.

39. The method of claim 31 wherein the transmitted signals are frequency shift keyed signals.

40. The method of claim 31 wherein the transmitted signals are multi-tone modulated signals.

41. The method of claim 31 which further includes the steps of sensing the signals which are communicated between the central location and the subscriber premises, wherein the communicated signals have a level which is continuously variable between a minimum level and a maximum level, and dynamically adjusting the level of the supervisory signal responsive to increases and decreases in the sensed level of the communicated signals.

42. The method of claim 31 which further includes the steps of sensing the signals which are communicated between the central location and the subscriber premises, wherein the communicated signals have a level which is continuously variable between a minimum level and a maximum level, and dynamically adjusting the frequency of the supervisory signal responsive to increases and decreases in the sensed level of the communicated signals.

43. The method of claim 31 which further includes the steps of sensing the signals which are communicated between the central location and the subscriber premises, wherein the communicated signals have a level which is continuously variable between a minimum level and a maximum level, and dynamically adjusting the level and frequency of the supervisory signal responsive to increases and decreases in the sensed level of the communicated signals.

44. The method of claim 31 which further includes the steps of sensing activation of telephone equipment other than the telephones at the subscriber premises, and temporarily interrupting communications between the central location and the subscriber premises responsive to sensing the activation of the telephone equipment.

45. The method of claim 31 wherein the band pass filtering associated with the digital transmission equipment of the telephone signal communicating network passes frequencies in a range from 300 to 3200 Hz.

46. The method of claim 31 which further includes the steps of sensing off-hook conditions of the conventional telephone at the individual subscriber's premises, and inhibiting transmissions of the signals from the central location to the individual subscriber's premises responsive to the sensing of the off-hook conditions.

47. The method of claim 46 which further includes the step of advising the central location of hook status conditions of the telephones at the subscriber premises responsive to signals detected at the subscriber premises.

48. The method of claim 47 wherein the advising of hook status conditions is performed by a carrier signal, separate from and in addition to the supervisory signal, at a frequency transmitted by the telephone signal communicating network.

49. The method of claim 48 which further includes the step of transmitting the carrier signal only when the telephone at the individual subscriber's premises is on-hook, and when the instrumentalities assume the second predetermined state.

50. The method of claim 46 which further includes the step of transmitting the supervisory signal from the subscriber premises during the off-hook conditions of the telephones at the subscriber premises.

51. The method of claim 46 which further includes the step of transmitting the supervisory signal from the subscriber premises during both on-hook and the off-hook conditions of the telephones at the subscriber premises.

52. The method of claim 46 which further includes the steps of sensing discontinuance of the supervisory signal during the sensing of the off-hook condition at the individual subscriber's premises, and transmitting the signals from the central location to the individual subscriber's premises responsive to the sensing of the discontinuance of the supervisory signal.

53. The method of claim 46 which further includes the steps of sensing discontinuance of the off-hook condition of the telephone at the individual subscriber's premises, and transmitting the signals from the central location to the individual subscriber's premises responsive to the sensing of the discontinuance of the off-hook condition.

54. The method of claim 53 wherein the sensing of the discontinuance of the off-hook condition is performed at the subscriber premises, and which further includes the step of transmitting the sensing of the discontinuance of the off-hook condition to the central location.

55. A method for communicating between a central location and instrumentalities other than a conventional telephone located at premises of telephone network subscribers, comprising the steps of:

selectively transmitting signals from the central location to different subscriber premises using a telephone signal communicating network;

retransmitting signals from the subscriber premises to the central location, using the telephone signal communicating network and responsive to the transmitted signals, wherein the retransmitted signals are in an audible telephone frequency range and are indicative of states of the instrumentalities;

transmitting a supervisory signal having a frequency capable of transmission using the telephone signal communicating network and an attenuated level, from each of the subscriber premises to the central location, when the instrumentalities at the subscriber premises are in a first predetermined state;

producing the supervisory signal as a data containing series of bits; and interrupting the transmission of the supervisory signal responsive to one of the instrumentalities at an individual subscriber's premises assuming a second predetermined state.

56. The method of claim 55 which further includes the step of encrypting the supervisory signal.

57. The method of claim 55 which further includes the step of providing the data containing series of bits with an identification code corresponding to the means located at the individual subscriber's premises.

58. The method of claim 55 which further includes the steps of advising the central location of hook status conditions of the telephones at the subscriber premises by including the hook status conditions of the telephones at the subscriber premises in the data containing series of bits communicated to the central location.

59. The method of claim 55 which further includes the steps of remotely monitoring equipment at the subscriber premises, and communicating data associated with the remotely monitored equipment between the subscriber premises and the central location by including the data associated with the remotely monitored equipment in the data containing series of bits.

60. The method of claim 55 which further includes the step of establishing two-way communications between the central location and the subscriber premises using the data containing series of bits.

61. A system for providing communication between a central location and instrumentalities other than a conventional telephone located at premises of telephone network subscribers, comprising:

means for selectively transmitting signals from the central location to different subscriber premises using a telephone signal communicating network;

means located at the subscriber premises, connected to the telephones and responsive to the transmitted signals, for retransmitting signals from the subscriber premises to the central location in an audible telephone frequency range and indicative of states of the instrumentalities, using the telephone signal communicating network;

means for transmitting a supervisory signal having a frequency capable of transmission using the telephone signal communicating network and an attenuated level, from each of the subscriber premises to the central location, when the instrumentalities at the subscriber premises are in a first predetermined state, wherein the frequency of the supervisory signal is from 200 Hz to 300 Hz; and means responsive to one of the instrumentalities at an individual subscriber's premises assuming a second predetermined state, for interrupting the transmission of the supervisory signal.

62. A system for providing communication between a central location and instrumentalities other than a conventional telephone located at premises of telephone network subscribers, comprising:

a telephone signal communicating network;

means for selectively transmitting signals from the central location to different subscriber premises using the telephone signal communicating network;

means located at the subscriber premises, connected to the telephones and responsive to the transmitted signals, for retransmitting signals from the subscriber premises to the central location in an audible telephone frequency range and indicative of states of the instrumentalities, using the telephone signal communicating network;

means for transmitting a supervisory signal having a frequency capable of transmission using the telephone signal communicating network with digital transmission equipment having band pass filtration means which passes signals limited to audible frequencies, and at an attenuated level, from each of the subscriber premises to the central location, when the instrumentalities at the subscriber premises are in a first predetermined state; and means responsive to one of the instrumentalities at an individual subscriber's premises assuming a second predetermined state, for interrupting the transmission of the supervisory signal.

63. A method for communicating between a central location and instrumentalities other than a conventional telephone located at premises of telephone network subscribers, comprising the steps of:

selectively transmitting signals from the central location to different subscriber premises using a telephone signal communicating network;

retransmitting signals from the subscriber premises to the central location, using the telephone signal communicating network and responsive to the transmitted signals, wherein the retransmitted signals are in an audible telephone frequency range and are indicative of states of the instrumentalities;

transmitting a supervisory signal having a frequency capable of transmission using the telephone signal communicating network and an attenuated level, from each of the subscriber premises to the central location, when the instrumentalities at the subscriber premises are in a first predetermined state, wherein the frequency of the supervisory signal is from 200 Hz to 300 Hz; and interrupting the transmission of the supervisory signal responsive to one of the instrumentalities at an individual subscriber's premises assuming a second predetermined state.

64. A method for communicating between a central location and instrumentalities other than a conventional telephone located at premises of telephone network subscribers, comprising the steps of:

selectively transmitting signals from the central location to different subscriber premises using a telephone signal communicating network;

retransmitting signals from the subscriber premises to the central location, using the telephone signal communicating network and responsive to the transmitted signals, wherein the retransmitted signals are in an audible telephone frequency range and are indicative of states of the instrumentalities;

transmitting a supervisory signal having a frequency capable of transmission using the telephone signal communicating network with digital transmission equipment having band pass filtering which passes signals limited to audible frequencies, and an attenuated level, from each of the subscriber premises to the central location, when the instrumentalities at the subscriber premises are in a first predetermined state; and interrupting the transmission of the supervisory signal responsive to one of the instrumentalities at an individual subscriber's premises assuming a second predetermined state.

\* \* \* \* \*